United States Patent
Yamamoto et al.

(10) Patent No.: US 7,218,099 B2
(45) Date of Patent: May 15, 2007

(54) DISPLACEMENT SENSOR

(75) Inventors: Yuichi Yamamoto, Tochigi (JP); Yukio Shoji, Tochigi (JP); Nobumi Yoshida, Tochigi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 11/100,628

(22) Filed: Apr. 7, 2005

(65) Prior Publication Data

US 2005/0231193 A1    Oct. 20, 2005

(30) Foreign Application Priority Data

Apr. 8, 2004    (JP)    ............... 2004-113879

(51) Int. Cl.
G01B 7/14    (2006.01)
G01B 7/30    (2006.01)
(52) U.S. Cl. ............... 324/207.25; 324/207.24
(58) Field of Classification Search ........... 324/207.24, 324/207.25
See application file for complete search history.

(56) References Cited

U.S. PATENT DOCUMENTS 4,966,041 A    10/1990  Miyazaki 5,201,838 A *  4/1993  Roudaut ................ 294/88
6,418,788 B2 * 7/2002  Articolo ................ 73/314
6,433,536 B1 * 8/2002  Yundt et al. .......... 324/207.22

FOREIGN PATENT DOCUMENTS

| EP | 0 561 524 A1 | 9/1993 |
| JP | 58-193403 | 11/1983 |
| JP | 2000-258109 | 9/2000 |
| JP | 2002-273642 | 9/2002 |

* cited by examiner

Primary Examiner—Reena Aurora
(74) Attorney, Agent, or Firm—Westerman, Hattori, Daniels & Adrian, LLP.

(57) ABSTRACT

A plurality of Hall ICs 34A, 34B are disposed around a magnetic rod 32 that is movable along a central axis. The Hall ICs are disposed in different positions in terms of both a straight line distance coordinate in the direction of the central axis and a rotational angle coordinate around the central axis. The amount of displacement of the magnetic rod 32 is calculated based on the average of output signals from the Hall ICs. Errors in the output signals due to a shift and tilt of the magnetic rod are detected and calibration of the measurement method is carried out.

13 Claims, 6 Drawing Sheets

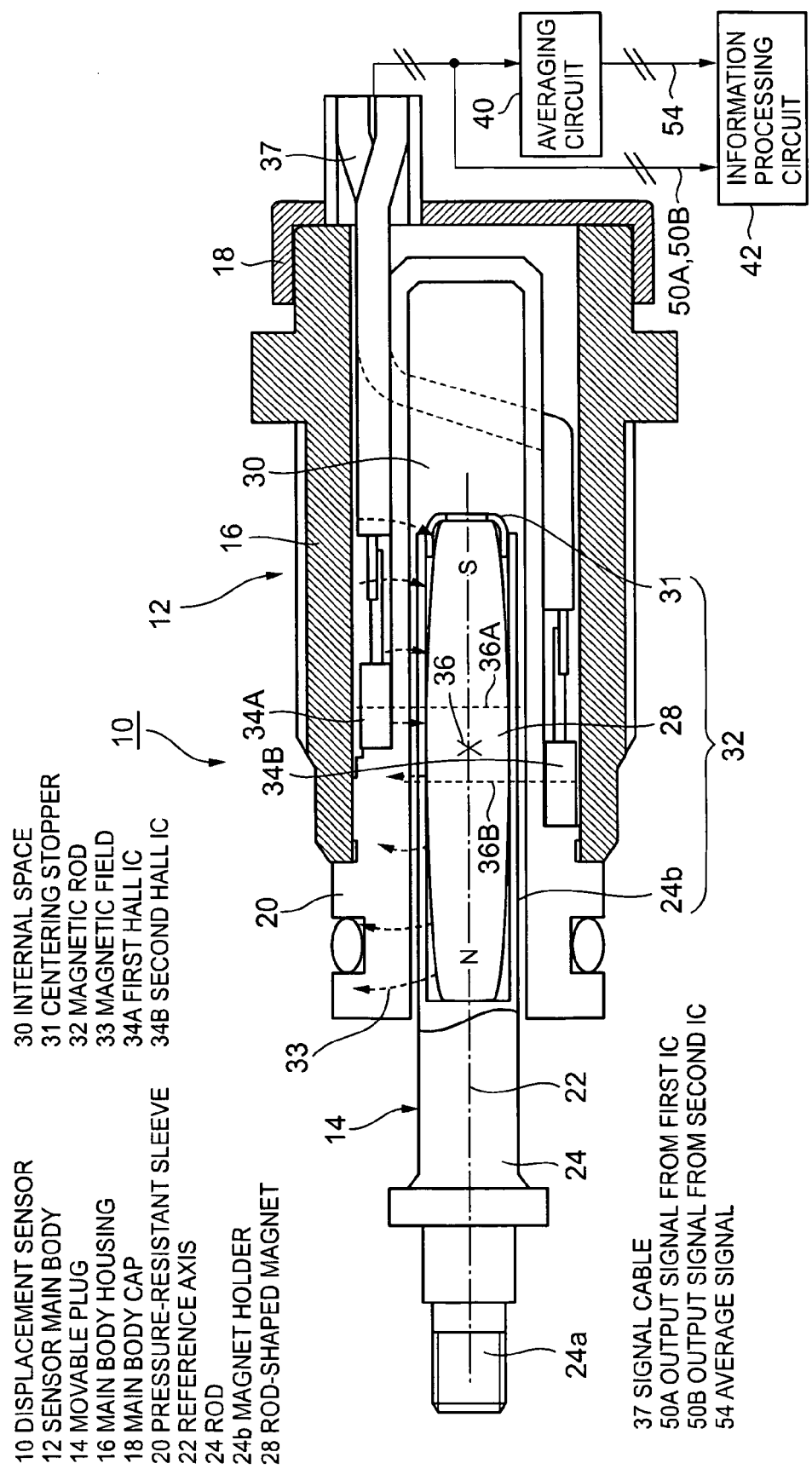

20 PRESSURE-RESISTANT SLEEVE
22 REFERENCE AXIS
28 ROD-SHAPED MAGNET
32 MAGNETIC ROD
34A FIRST HALL IC
34B SECOND HALL IC
34C THIRD HALL IC

34A FIRST HALL IC
34B SECOND HALL IC
50A OUTPUT SIGNAL FROM FIRST IC
50B OUTPUT SIGNAL FROM SECOND IC
54 AVERAGE SIGNAL
58 DISPLACEMENT DATA
60 CORRECTION

22 REFERENCE AXIS
32 MAGNETIC ROD
34A FIRST HALL IC
34B SECOND HALL IC
a SHIFT AMOUNT
b TILT ANGLE

FIG. 6A

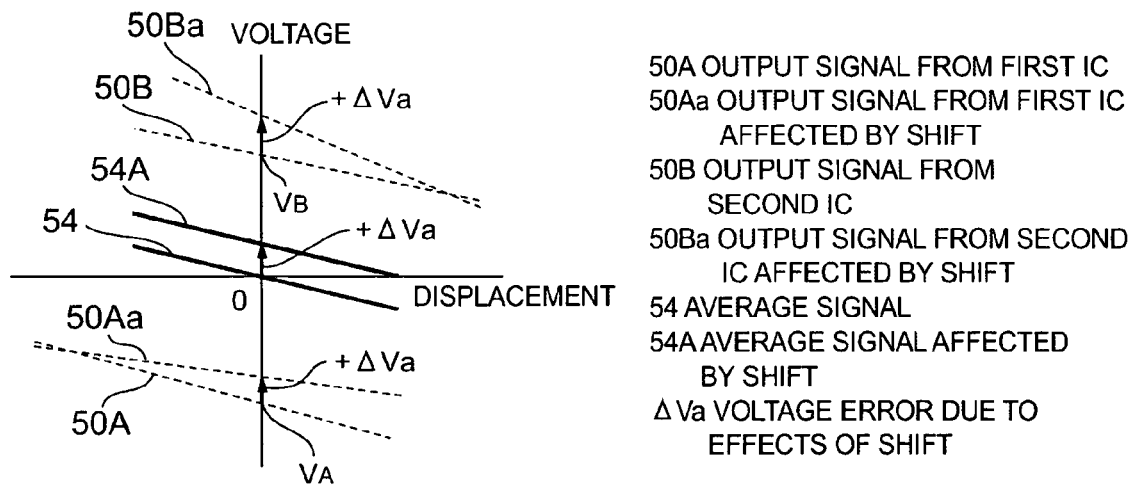

50A OUTPUT SIGNAL FROM FIRST IC
50Aa OUTPUT SIGNAL FROM FIRST IC AFFECTED BY SHIFT
50B OUTPUT SIGNAL FROM SECOND IC
50Ba OUTPUT SIGNAL FROM SECOND IC AFFECTED BY SHIFT
54 AVERAGE SIGNAL
54A AVERAGE SIGNAL AFFECTED BY SHIFT
$\Delta Va$ VOLTAGE ERROR DUE TO EFFECTS OF SHIFT

FIG. 6B

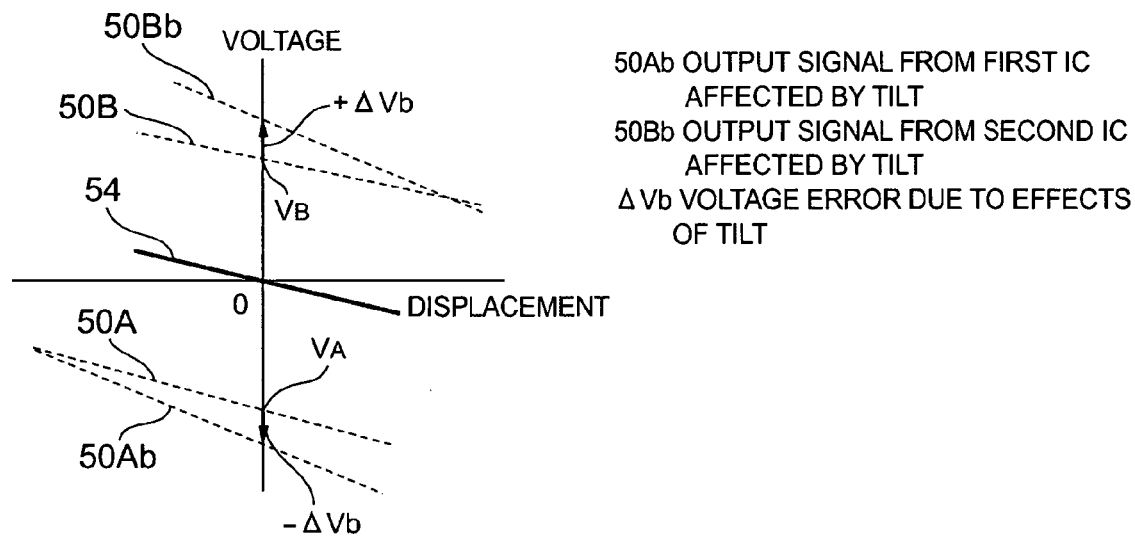

50Ab OUTPUT SIGNAL FROM FIRST IC AFFECTED BY TILT
50Bb OUTPUT SIGNAL FROM SECOND IC AFFECTED BY TILT
$\Delta Vb$ VOLTAGE ERROR DUE TO EFFECTS OF TILT

DISPLACEMENT SENSOR

BACKGROUND OF THE INVENTION

1. Field of the Invention

The present invention relates to a displacement sensor that comprises magnetic sensing devices such as Hall ICs, and a magnetic member that generates a magnetic field and is movable relative to the magnetic sensing devices, the displacement sensor outputting electrical signals from the magnetic sensing devices having a level corresponding to the amount of displacement of the magnetic member.

2. Description of the Related Art

A displacement sensor disclosed in Japanese Patent Application Laid-open No. 2000-258109 has a rod-shaped magnetic member (e.g. a magnet) joined to a mover, and two magnetic sensing devices are disposed in positions differing by 180° on the same circumference centered on a central axis of the magnetic member. Output signals from the two magnetic sensing devices are averaged, whereby errors in the output signals from the two magnetic sensing devices due to misalignment of the rod-shaped magnet in the radial direction cancel each other out, and hence the accuracy of position detection is improved.

With such a displacement sensor, it is generally desired to expand the range of amounts of displacement that can be detected (the detection range).

Moreover, the installation position of the magnetic member may be slightly misaligned from the proper position. This misalignment comprises two components, a shift in the central axis of the magnetic member in the radial direction from the proper position of the axis, and a tilt of the central axis of the magnetic member from the proper direction of the axis; in general, such a shift and tilt are present compounded together. Errors occur in the output signals from the magnetic sensing devices due to this shift and tilt. It is desirable for errors due to such misalignment to be detected when the displacement sensor is shipped out from the factory, during use or the like, and for the displacement sensor to be calibrated based on this. However, with the prior art described above, the errors in the output signals from the magnetic sensing devices cannot be detected in the case that a shift and tilt of the magnetic member are compounded together.

SUMMARY OF THE INVENTION

It is thus an object of the present invention to expand the detection range of a displacement sensor.

It is another object of the present invention to enable errors in the output signals from magnetic sensing devices caused by a shift and tilt of a magnetic member to be detected in the case that the shift and tilt are present compounded together.

A displacement sensor according to the present invention comprises a plurality of magnetic sensing devices, and a magnetic member that is movable relative to the magnetic sensing devices along a prescribed reference axis, and forms, at the position of each of the magnetic sensing devices, a magnetic field having a strength that varies according to an amount of displacement in the movement direction. Moreover, under a cylindrical coordinate system comprising a straight line distance coordinate along the reference axis, a rotational angle coordinate centered on the reference axis, and a radial distance coordinate from the reference axis, the magnetic sensing devices are disposed in different positions in terms of the straight line distance coordinate, and each of the magnetic sensing devices outputs a signal having a level corresponding to the strength of the magnetic field at the respective location.

According to the above displacement sensor, a plurality of magnetic sensing devices that are disposed in different positions in terms of the straight line distance coordinate are used. As a result, the range of amounts of displacement that can be detected (the detection range) is expanded compared with the prior art.

With the above displacement sensor, there may be further provided an averaging circuit that receives the output signals from the magnetic sensing devices, and outputs an average signal having a level that is the average of the levels of these output signals. By using the average signal from this averaging circuit, amounts of displacement can be measured over the above-mentioned expanded detection range.

With the above displacement sensor, a magnetic member in which a magnet is housed and fixed inside a holder made of a nonmagnetic material may be used as the magnetic member. According to this constitution, the magnet, which is easily damaged, can be protected.

With the above displacement sensor, the magnetic sensing devices may be disposed in different positions in terms of not only the straight line distance coordinate but also the rotational angle coordinate. According to this constitution, even in the case that a shift and tilt of the magnetic member are compounded together, errors in the output signals from the magnetic sensing devices due to the shift and tilt can be detected based on the signals from the magnetic sensing devices. The detected errors can be used to correct a computational method for determining the amount of displacement from the output signals of the magnetic sensing devices (or to correct the amount of displacement determined).

With the above displacement sensor, two magnetic sensing devices out of the magnetic sensing devices maybe disposed in angular positions differing by 180° in terms of the rotational angle coordinate. Alternatively, three or more magnetic sensing devices may be disposed in positions differing by an angle obtained by dividing 360° equally by the number of the magnetic sensing devices in terms of the rotational angle coordinate. Alternatively, three or more magnetic sensing devices may be disposed in positions differing by 180° in terms of the rotational angle coordinate alternately following the order of arrangement of the magnetic sensing devices in terms of the straight line distance coordinate. Other variations of the arrangement of the plurality of magnetic sensing devices also exist.

In the case of disposing three or more magnetic sensing devices in different positions in terms of the straight line distance coordinate, the detection range can be expanded yet more.

BRIEF DESCRIPTION OF THE DRAWINGS

FIG. 1 consists of a sectional drawing of mechanical parts and a block diagram of electrical parts showing the overall constitution of an embodiment of a displacement sensor according to the present invention;

FIGS. 6A and 6B show changes in the output signals from two Hall ICs due to the shift and tilt shown in FIGS. 5A and 5B.

DESCRIPTION OF THE PREFERRED EMBODIMENTS

Figure 2A:
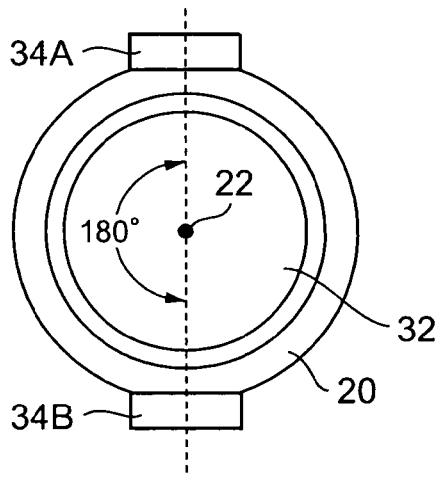
FIGS. 2A to 2E show different examples of the arrangement of a plurality of Hall ICs in terms of a rotational angle coordinate.

FIG. 1 consists of a sectional drawing of mechanical parts and a block diagram of electrical parts showing the overall constitution of an embodiment of a displacement sensor according to the present invention. In FIG. 1, parts shown with diagonal hatching are parts made of a magnetic material. With the exception of a magnet 28, parts shown with no hatching are parts made of a nonmagnetic material (e.g. nonmagnetic stainless steel, plastic, rubber etc.).

As shown in FIG. 1, the mechanical parts of the displacement sensor 10 comprise a sensor main body 12 and a movable plug 14. The sensor main body 12 has a tubular main body housing 16 having openings at front and rear ends thereof, the rear end of the main body housing 16 being covered with a main body cap 18. The main body housing 16 and the main body cap 18 are each made of a magnetic material, and constitute an outer shell of the sensor main body 12, and have a function of magnetically shielding the inside of the sensor main body 12 from the outside.

A pressure-resistant sleeve 20 is inserted and fixed in the main body housing 16 from the opening at the front end of the main body housing 16. The pressure-resistant sleeve 20 has an opening in a front end thereof, and has a long, thin, cylindrical internal space 30 therein enclosed by walls thereof. A representative use of the displacement sensor 10 is, for example, to detect the amount of displacement of hydraulic machinery, for example to detect the stroke of a hydraulic valve; in this use, the internal space 30 of the pressure-resistant sleeve 20 is filled with high-pressure hydraulic fluid, and hence the walls of the pressure-resistant sleeve 20 are subjected to a high hydraulic pressure. The pressure-resistant sleeve 20 is made of a sturdy nonmagnetic material (e.g. nonmagnetic stainless steel), and has a strength sufficient to be able to withstand the high hydraulic pressure from the internal space 30.

The movable plug 14 is inserted into the internal space 30 of the pressure-resistant sleeve 20 from the opening at the front end of the pressure-resistant sleeve 20. The movable plug 14 is ideally aligned with the pressure-resistant sleeve 20 such that a central axis of the movable plug 14 and a central axis 22 of the internal space 30 (hereinafter referred to as the 'reference axis') coincide perfectly. However, in actual practice, the central axis of the movable plug 14 may be shifted by a slight distance in the radial direction and tilted by a slight angle from the reference axis 22, and this shift and tilt will cause an error in the displacement sensor 10. The movable plug 14 is movable within a certain distance range along the reference axis 22. The outside diameter of the part of the movable plug 14 that is inserted in the pressure-resistant sleeve 20 is slightly smaller than the inside diameter of the pressure-resistant sleeve 20, whereby a small clearance is secured between the external surface of the movable plug 14 and the internal surface of the pressure-resistant sleeve 20, so that the movable plug 14 can move smoothly.

The movable plug 14 has as a main body thereof a cylindrical rod 24 that is made of a nonmagnetic material. A front end part 24a of the rod 24 is joined to the object for which the amount of displacement is to be measured, for example the spool of a hydraulic valve. A rear-half part of the rod 24 inserted in the pressure-resistant sleeve 20 constitutes a hollow cylindrical holder 24b having an opening in a rear end thereof, and the magnet 28 is inserted in this holder 24b. A centering stopper 31 installed in an opening in a rear end of the holder 24b stops up a gap between the rear end of the holder 24b and the rear end of the magnet 28, whereby the magnet 28 is fixed in the holder 24b so as to not move. Furthermore, the centering stopper 31 fixes the gap between the rear end of the holder 24b and the rear end of the magnet 28 around the circumference, thus fulfilling a centering role of making the central axis of the magnet 28 and the central axis of the rod 24 coincide. In the following description, the rear-half part 32 of the movable plug 14 (i.e. the part comprising the holder 24b, the magnet 28 and the centering stopper 31) is referred to as the 'magnetic rod'. A magnetic field 33 due to the magnet 28 is formed around the outside of this magnetic rod 32.

Here, let us consider a cylindrical coordinate system comprising a straight line distance coordinate in the direction along the reference axis 22, a rotational angle coordinate centered on the reference axis 22, and a radial distance coordinate from the reference axis 22. It is desirable for the strength distribution of the magnetic field 33 along the straight line distance coordinate of this cylindrical coordinate system to be linear. With this objective, the magnet 28 has, for example, a spindle shape that tapers from the center toward the two ends.

A plurality of (e.g. two) magnetic sensing devices, for example Hall ICs 34A and 34B, are fixed to an outside surface of the pressure-resistant sleeve 20 in the sensor main body 12. The locations of the two Hall ICs 34A and 34B differ from one another in terms of both the straight line distance coordinate and the rotational angle coordinate in the cylindrical coordinate system described above, but are in the same position in terms of the radial distance coordinate. FIG. 1 shows a neutral state in which the movable plug 14 is positioned in the center of its range of movement. In this neutral state, the positions 36A and 36B along the straight line distance coordinate of the two Hall ICs 34A and 34B are each the same distance from a central position 36 of the distribution of the magnetic field 33 but in opposite directions. The two Hall ICs 34A and 34B respectively output voltage signals 50A and 50B having a level corresponding to the strength of the magnetic field component in the radial direction centered on the reference axis 22 of the magnetic field 33 in the location of that Hall IC 34A or 34B.

The voltage signals 50A and 50B outputted from the Hall ICs 34A and 34B are inputted via signal cables 37 into an information processing circuit 42 which is provided outside the sensor main body 12. Moreover, the voltage signals 50A and 50B are also inputted into an averaging circuit 40. The averaging circuit 40 outputs an average signal 54 having a level that is the average of the levels of the two inputted voltage signals 50A and 50B. This average signal 54 is also inputted into the information processing circuit 42. The information processing circuit 42 calculates the amount of displacement of the movable plug 14 (and hence the object targeted for measurement) based on the average signal 54 using a method described later. Moreover, the information processing circuit 42 also carries out calibration of the processing of calculating the amount of displacement based on the voltage signals 50A and 50B (in particular the voltage levels obtained in the neutral state described earlier) from the Hall ICs 34A and 34B using a method described later.

Note that the averaging circuit 40 maybe disposed outside the sensor main body 12 as shown in FIG. 1, but may alternatively be disposed inside the sensor main body 12.

Figure 2B:
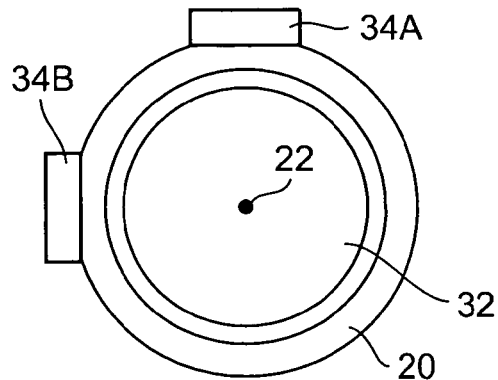

FIGS. 2A and 2B show examples of the arrangement of the two Hall ICs 34A and 34B shown in FIG. 1 in terms of the rotational angle coordinate.

In the example of FIG. 2A, the two Hall ICs 34A and 34B are disposed in positions such that 360° is divided equally by the number of Hall ICs (two), i.e. in positions differing by 180° in terms of the rotational angle coordinate, in other words in positions on opposite sides centered on the reference axis 22. Alternatively, as shown in FIG. 2B, the Hall ICs 34A and 34B may be disposed in positions that differ by an angle other than 180° (e.g. 90° in the case of FIG. 2B).

In the example of the displacement sensor 10 shown in FIG. 1, two Hall ICs are provided, but more Hall ICs than this (e.g. three, four, or more) may be provided, the Hall ICs being arranged in different positions to each other in terms of the straight line distance coordinate and the rotational angle coordinate described earlier.

Figure 2C:
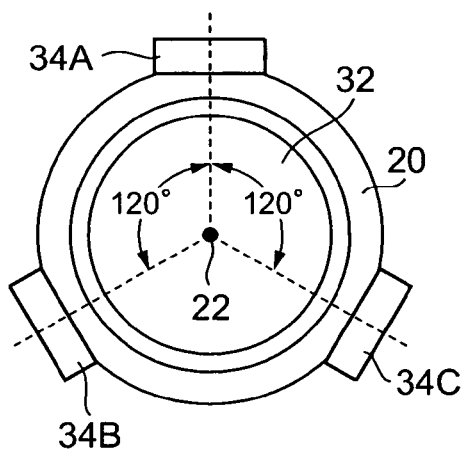
Figure 2D:
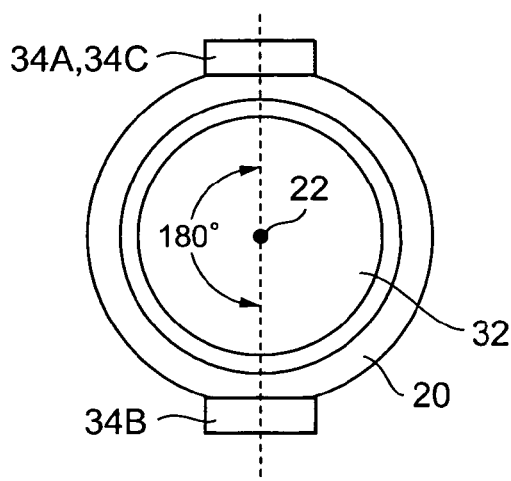
Figure 2E:
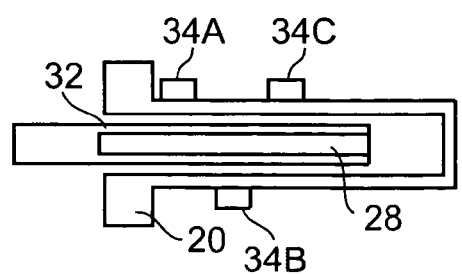

FIGS. 2C to 2E show examples of the arrangement of the Hall ICs in terms of the rotational angle coordinate in the case that more than two Hall ICs, for example three Hall ICs 34A, 34B and 34C, are provided.

In the example of FIG. 2C, the three Hall ICs 34A, 34B and 34C are disposed in positions such that 360° is divided equally by the number of Hall ICs (three), i.e. in positions differing by 120° in terms of the rotational angle coordinate. In the example shown in FIGS. 2D and 2E, the three Hall ICs 34A, 34B and 34C are disposed in positions that differ by 180° in terms of the rotational angle coordinate such as to alternate following the order of disposition in terms of the straight line distance coordinate.

In the case that three or more Hall ICs are provided as shown in FIGS. 2C to 2E, an average signal may be produced by averaging the levels of the output signals of all of the Hall ICs, with the amount of displacement being calculated using this average signal. Alternatively, an average signal may be produced for each pair of two Hall ICs out of the three or more Hall ICs, with the amount of displacement being calculated using these average signals. Any of various arrangements other than those of the examples shown in FIGS. 2A to 2E may also be adopted.

Figure 3:
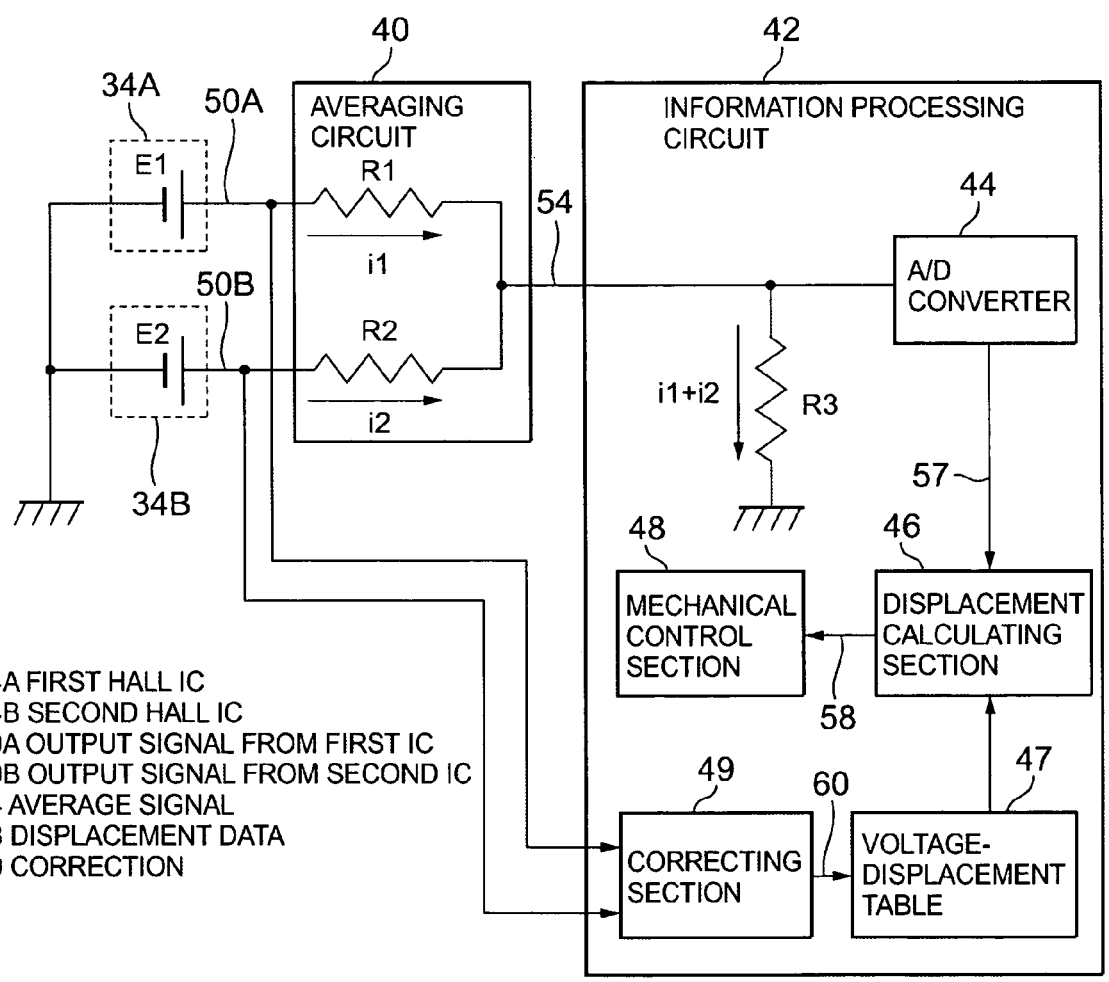
FIG. 3 is a diagram showing the constitution of an averaging circuit 40 and an information processing circuit 42.

FIG. 3 shows the constitution of the averaging circuit 40 and the information processing circuit 42.

As shown in FIG. 3, the averaging circuit 40 has a simple constitution comprising two input terminals for inputting the voltage signals 50A and 50B outputted from the Hall ICs 34A and 34B, one output terminal for outputting the average signal 54, and two resistors R1 and R2 connected respectively between the two input terminals and the output terminal. The averaging circuit 40 can thus be created, for example, merely by inserting the resistors R1 and R2 in the output lines from the Hall ICs 34A and 34B. The output terminal of the averaging circuit 40 is joined to an analog input terminal of an A/D converter 44 in the information processing circuit 42. The analog input terminal of the A/D converter 44 is connected to ground via a resistor R3.

Here, a quantitative explanation of the level of the average signal 54 outputted from the averaging circuit 40 is as follows. First, as shown in FIG. 3, the Hall ICs 34A and 34B are each equivalent to a cell generating a voltage corresponding to the magnetic field strength; let us take the output voltages to be E1 and E2 respectively. To simplify the explanation, let us assume that the resistors R1 and R2 have the same resistance value as each other.

$$E1 = R1 \cdot i1 + R3(i1+i2) \quad (1)$$

$$E2 = R1 \cdot i2 + R3(i1+i2) \quad (2)$$

Level of average signal $54 = R3(i1+i2)$ (3)

Therefore:

Level of average signal $54 = (E1+E2)/2 - R1(i1+i2)/2$ (4)

The first term on the right hand side of equation (4) is the average of the levels of the outputs of the Hall ICs 34A and 34B, and the second term is an error.

Here, if the resistors R1 and R2 are set to have a resistance value sufficiently smaller than that of the resistor R3 in accordance with the required accuracy, then the error will be sufficiently small as to be ignorable, and hence the required accuracy will be obtained. For example, the resistors R1 and R2 can be made to have a resistance value of a few hundred $\Omega$, and the resistor R3 can be made to have a resistance value of a few hundred $\Omega$. As a specific example, considering the case that R1=R2=100$\Omega$, R3=220$\Omega$, and E1=E2=4V (incidentally, the output level of a Hall IC is generally approximately 1 to 4V), the above error will be 0.9 mV, which is very small compared with the average value of 4V. In this way, the output signals of the Hall ICs 34A and 34B can be averaged accurately using an averaging circuit 40 having an extremely simple constitution as shown in FIG. 3.

As shown in FIG. 3, the information processing circuit 42 has the A/D converter 44, a displacement calculating section 46, a voltage-displacement table 47, a mechanical control section 48, and a correcting section 49. The A/D converter 44 converts the average signal 54 which gives the analog average voltage into average voltage data 57 which gives the digital average voltage. The voltage-displacement table 47 has stored therein amounts of displacement corresponding respectively to various average voltage values that the average voltage data 57 could take. The displacement calculating section 46 refers to the voltage-displacement table 47, and converts the average voltage data 57 into displacement data 58 which gives the corresponding amount of displacement. The mechanical control section 48 controls machinery (e.g. hydraulic machinery), not shown in the drawings, based on the displacement data 58.

Voltage signals 50A and 50B outputted from the Hall ICs 34A and 34B, in particular the voltage signals 50A and 50B when the displacement sensor 10 is in the neutral state described earlier, are inputted into the correcting section 49. Based on the inputted voltage signals 50A and 50B in the neutral state, the correcting section 49 then calculates the errors in the voltage signals 50A and 50B caused by the shift and tilt of the magnetic rod 32 from the reference axis 22. Based on the calculated errors, the correcting section 49 then corrects the voltage-displacement table 47 such that the amount of displacement corresponding to each average voltage becomes correct. The method of calculating the errors will be described later with reference to FIG. 6.

Following is a description of the operation under the constitution described above.

FIG. 4 consists of graphs for explaining how the range of amounts of displacement that can be detected (the detection range) is expanded by using the average signal 54. In FIG. 4, the point where the amount of displacement is zero indicates the neutral state.

Figure 4A:
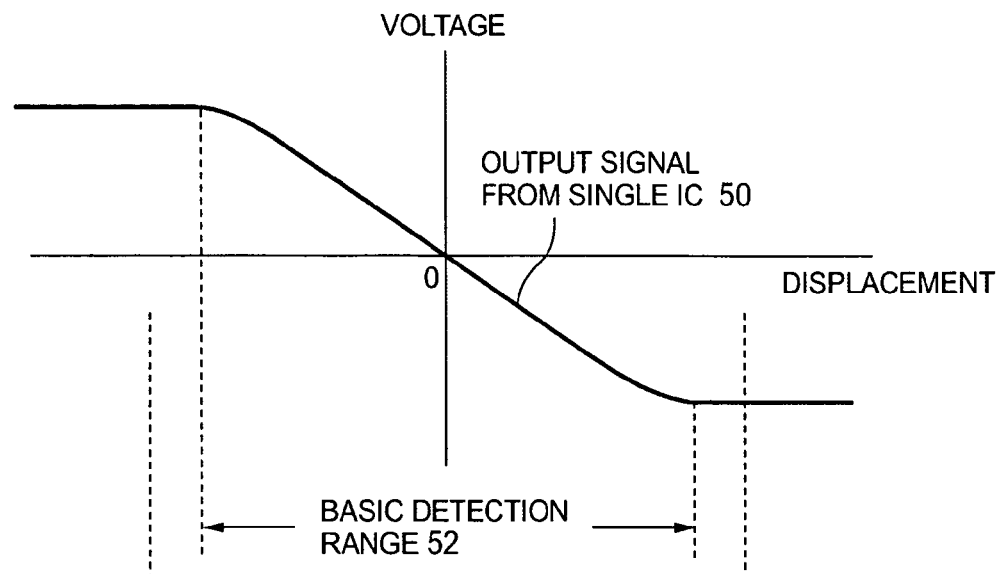
FIGS. 4A and 4B show graphs for explaining how a detection range is expanded by using an average signal 54.

FIG. 4A shows the output signal 50 of a displacement sensor having one Hall IC, and the maximum detection range (hereinafter referred to as the 'basic detection range') 52 therefor. The range over which the slope of the output signal 150 is substantially non-zero is the basic detection range 52. With the displacement sensor described in Japanese Patent Application Laid-open No. 2000-258109, two Hall ICs are used, but these two Hall ICs are in the same position in terms of the straight line distance coordinate, and hence the detection range is the same as the basic detection range 52 for a single Hall IC shown in FIG. 4A.

Figure 4B:
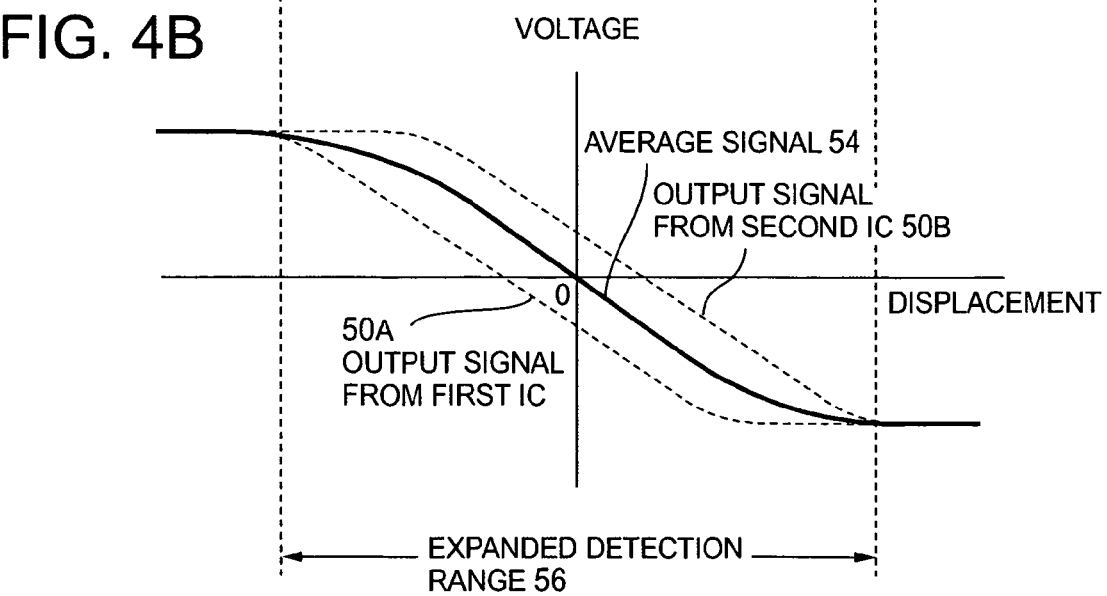

FIG. 4B shows the average signal 54 and the detection range 56 for the displacement sensor 10 according to the present invention having two Hall ICs 34A and 34B that are disposed in different positions in terms of the straight line distance coordinate and the rotational angle coordinate as shown in FIG. 1.

As shown in FIG. 4B, the curves of the output signals 50A and 50B from the two Hall ICs 34A and 34B are each shifted by a certain amount of displacement from the zero point of the amount of displacement but in opposite directions to one another. The detection range 56 for the average signal 54 is thus expanded on each side by this certain amount of displacement compared with the basic detection range 52 of FIG. 4A. Furthermore, with a constitution in which three or more Hall ICs are disposed indifferent positions in terms of the straight line distance coordinate as shown in FIGS. 2C to 2E, the detection range can be expanded yet more.

Figure 5A:
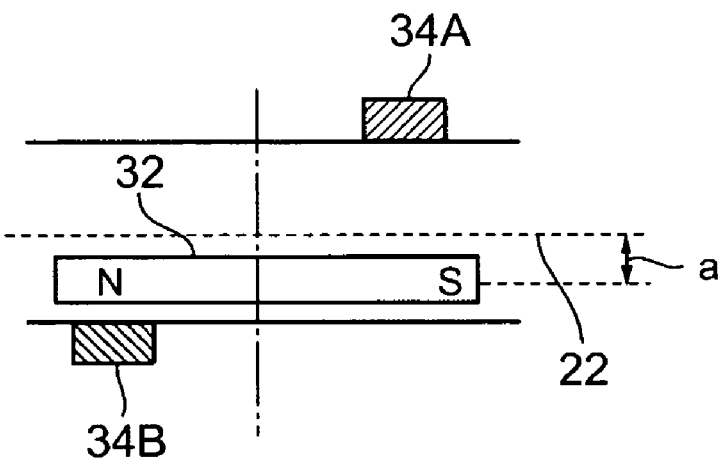
FIG. 5A shows an example of the shift of a magnetic rod 32 relative to a reference axis 22.
Figure 5B:
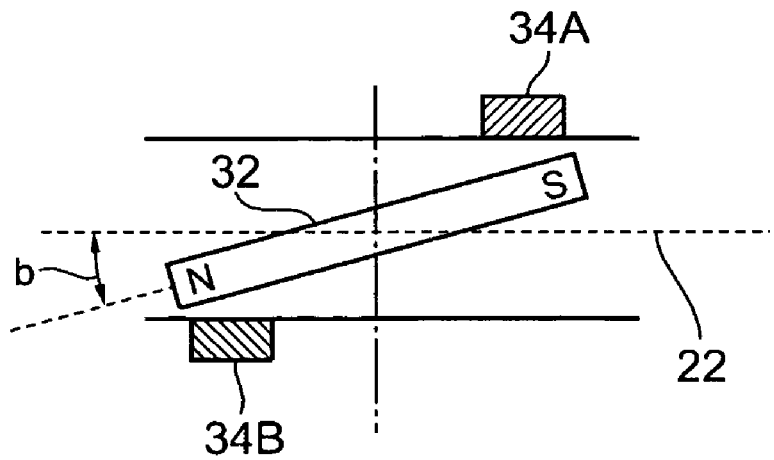
FIG. 5B shows an example of the tilt of a magnetic rod 32 relative to a reference axis 22.

FIG. 5 shows examples of the shift and tilt of the magnetic rod 32 relative to the reference axis 22. Specifically, FIG. 5A shows an example in which the magnetic rod 32 is shifted by a distance a from the reference axis 22 so as to become closer to the second Hall IC 34B. FIG. 5B shows an example in which the magnetic rod 32 is tilted by an angle b from the reference axis 22 such that the N pole of the magnetic rod 32 becomes closer to the second Hall IC 34B.

Moreover, FIG. 6A shows the changes in the output signals 50A and 50B from the two Hall ICs 34A and 34B around the neutral state caused by the shift shown in FIG. 5A. FIG. 6B shows the changes in the output signals 50A and 50B from the two Hall ICs 34A and 34B around the neutral state caused by the tilt shown in FIG. 5B.

If a shift as shown in FIG. 5A arises, then the magnetic rod 32 as a whole moves away from the first Hall IC 34A and closer to the second Hall IC 34B. As a result, as shown in FIG. 6A, around the neutral state (the zero point of the amount of displacement), the output signal from the first Hall IC 34A becomes like the output signal 50Aa, with the slope becoming smaller than for the normal output signal 50A. As a result, in the neutral state, the voltage level of the output signal 50Aa affected by the shift becomes higher by an error $\Delta Va$ than the normal voltage level VA. On the other hand, around the neutral state, the output signal from the second Hall IC 34B becomes like the output signal 50Ba, with the slope becoming greater than for the normal output signal 50B. As a result, in the neutral state, the voltage level of the output signal 50Ba affected by the shift becomes higher by an error $\Delta Va$ than the normal voltage level VB.

Moreover, if a tilt as shown in FIG. 5B arises, then the S pole of the magnetic rod 32 moves closer to the first Hall IC 34A, and the N pole moves closer to the second Hall IC 34B. As a result, as shown in FIG. 6B, around the neutral state, the output signal from the first Hall IC 34A becomes like the output signal 50Ab, with the slope becoming greater than for the normal output signal 50A. As a result, in the neutral state, the voltage level of the output signal 50Ab affected by the tilt becomes lower by an error $\Delta Vb$ than the normal voltage level VA. On the other hand, around the neutral state, the output signal from the second Hall IC 34B becomes like the output signal 50Bb, with the slope becoming greater than for the normal output signal 50B. As a result, in the neutral state, the voltage level of the output signal 50Bb affected by the tilt becomes higher by an error $\Delta Vb$ than the normal voltage level VB.

Consequently, in the case that the shift and tilt shown in FIGS. 5A and 5B are compounded together, in the neutral state, the level of the output signal from the first Hall IC 34A becomes 'VA+$\Delta Va$−$\Delta Vb$', and the level of the output signal from the second Hall IC 34B becomes 'VB+$\Delta Va$+$\Delta Vb$'.

Focusing on this, the correcting section 49 shown in FIG. 3 adds together the voltage levels 'VA+$\Delta Va$−$\Delta Vb$' and 'VB+$\Delta Va$+$\Delta Vb$' of the output signals from the two Hall ICs 34A and 34B in the neutral state to obtain '(VA+VB)+2$\Delta Va$', and then subtracts therefrom the sum 'VA+VB' of the voltage levels in the neutral state at a normal time which has been preset, thus determining the voltage error $\Delta Va$ due to the shift. Moreover, the correcting section 49 calculates the difference between the voltage levels 'VA+$\Delta Va$−$\Delta Vb$' and 'VB+$\Delta Va$+$\Delta Vb$' of the output signals from the two Hall ICs 34A and 34B in the neutral state to obtain '(VA−VB)−2$\Delta Vb$', and then subtracts therefrom the difference 'VA−VB' between the voltage levels in the neutral state at a normal time which has been preset, thus determining the voltage error $\Delta Vb$ due to the tilt. Using data or a program that defines the relationship between various voltage errors $\Delta Va$ and $\Delta Vb$ and correction amounts for the voltage-displacement table 47 as determined in advance either empirically or theoretically, the correcting section 49 then corrects the voltage-displacement table 47 in accordance with the determined voltage errors $\Delta Va$ and $\Delta Vb$. Through this correction, errors due to the effects of the shift and tilt are kept down, and hence the amount of displacement can be measured with high accuracy.

An embodiment of the present invention has been described above; however, this embodiment is merely an example for describing the present invention, and the scope of the present invention is not intended to be limited to only this embodiment. The present invention can be implemented in various other ways so long as the gist of the present invention is not deviated from.

For example, as the constitution of the magnetic rod, instead of a constitution in which a rod-shaped permanent magnet is used as described above, a constitution may be used in which ring-shaped permanent magnets are set around the outside at both ends of a rod-shaped magnetic core member, and the shape of the magnetic core member is designed such that a linear magnetic field strength distribution is obtained.

Moreover, in the case of a constitution in which three or more magnetic sensing devices 34A, 34B and 34C are disposed in different positions in terms of the straight line distance coordinate as shown in FIGS. 2C to 2E, it may be made such that these three or more magnetic sensing devices 34A, 34B and 34C are categorized into pairs of magnetic sensing devices that are adjacent to one another in terms of the straight line distance coordinate, for example a first pair comprising the first and second magnetic sensing devices 34A and 34B and a second pair comprising the second and third magnetic sensing devices 34B and 34C, and measurement of the amount of displacement is carried out based on the average signal as shown in FIG. 3 for each pair. It can then be made to be such that, for example, the amount of displacement in a detection zone covered by the first pair is measured based on the average signal from the first pair, and the amount of displacement in a detection zone covered by the second pair is measured based on the average signal from the second pair, i.e. the amount of displacement in the detection zone covered by each pair is determined using the signals from that pair. As a result, measurement of the amount of displacement can be carried out over a long distance comprising the detection ranges of the plurality of pairs joined together.

Moreover, in the embodiment described above, a constitution has been adopted in which the magnetic sensing devices are fixed, and the magnetic rod moves together with the object targeted for measurement. Instead of this, a constitution may be adopted in which the magnetic rod is fixed, and the magnetic sensing devices move together with the object targeted for measurement.

What is claimed is:

1. A displacement sensor, comprising:
   a plurality of magnetic sensing devices; and
   a magnetic member that is movable relative to said magnetic sensing devices along a prescribed reference axis, and forms, at the position of each of said magnetic sensing devices, a magnetic field having a strength that varies according to an amount of displacement in the movement direction;
   wherein under a cylindrical coordinate system comprising a straight line distance coordinate along said reference axis, a rotational angle coordinate centered on said reference axis, and a radial distance coordinate from said reference axis, said magnetic sensing devices are disposed in different positions in terms of said straight line distance coordinate, and each of said magnetic sensing devices outputs a signal having a level corresponding to the strength of said magnetic field at the respective location; and
   wherein said magnetic sensing devices are disposed in different positions in terms of said rotational angle coordinate.

2. The displacement sensor according to claim 1, further comprising an averaging circuit that receives the output signals from said magnetic sensing devices, and outputs an average signal having a level that is the average of the levels of the received output signals.

3. The displacement sensor according to claim 2, wherein two magnetic sensing devices out of said magnetic sensing devices are disposed in angular positions differing by 180° in terms of said rotational angle coordinate.

4. The displacement sensor according to claim 2, wherein said magnetic sensing devices are disposed in positions differing by an angle obtained by dividing 360° equally by the number of said magnetic sensing devices in terms of said rotational angle coordinate.

5. The displacement sensor according to claim 2, having at least three of said magnetic sensing devices, wherein said at least three of said magnetic sensing devices are disposed in positions differing by 180° in terms of said rotational angle coordinate alternately following the order of arrangement in terms of said straight line distance coordinate.

6. The displacement sensor according to claim 1, wherein said magnetic member has a holder made of a nonmagnetic material, and a magnet fixed inside said holder.

7. The displacement sensor according to claim 6 wherein two magnetic sensing devices out of said magnetic sensing devices are disposed in angular positions differing by 180° in terms of said rotational angle coordinate.

8. The displacement sensor according to claim 6, wherein said magnetic sensing devices are disposed in positions differing by an angle obtained by dividing 360° equally by the number of said magnetic sensing devices in terms of said rotational angle coordinate.

9. The displacement sensor according to claim 6, having at least three of said magnetic sensing devices, wherein said at least three of said magnetic sensing devices are disposed in positions differing by 180° in terms of said rotational angle coordinate alternately following the order of arrangement in terms of said straight line distance coordinate.

10. The displacement sensor according to claim 1, wherein two magnetic sensing devices out of said magnetic sensing devices are disposed in angular positions differing by 180° in terms of said rotational angle coordinate.

11. The displacement sensor according to claim 1, wherein said magnetic sensing devices are disposed in positions differing by an angle obtained by dividing 360° equally by the number of said magnetic sensing devices in terms of said rotational angle coordinate.

12. The displacement sensor according to claim 1, having at least three of said magnetic sensing devices, wherein said at least three of said magnetic sensing devices are disposed in positions differing by 180° in terms of said rotational angle coordinate alternately following the order of arrangement in terms of said straight line distance coordinate.

13. A displacement sensor according to claim 1, further comprising:
   an averaging circuit that receives the output signals from said magnetic sensing devices, and outputs an average signal having a level that is the average of the received output signals;
   a displacement calculating component that receives the average signal from said averaging circuit, and converts the received average signal into displacement data corresponding to the amount of displacement; and
   a correcting component that receives the output signals from said magnetic sensing devices when said magnetic member is positioned at a predetermined neutral position, detects errors in the received output signals, and corrects the output of said displacement calculating component based on the detected errors.

* * * * *